(12) United States Patent
Bailey et al.

(10) Patent No.: US 8,600,359 B2
(45) Date of Patent: Dec. 3, 2013

(54) DATA SESSION SYNCHRONIZATION WITH PHONE NUMBERS

(75) Inventors: Mark Bailey, Glendora, CA (US); James E. Christensen, Cortlandt Manor, NY (US); Steven D. Daniels, Merrick, NY (US); Jason B. Ellis, New York, NY (US); Robert G. Farrell, Cornwall, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/608,071

(22) Filed: Sep. 10, 2012

(65) Prior Publication Data

US 2013/0005365 A1    Jan. 3, 2013

Related U.S. Application Data

(63) Continuation of application No. 13/052,488, filed on Mar. 21, 2011.

(51) Int. Cl.
*H04M 3/42* (2006.01)
(52) U.S. Cl.
USPC ........ 455/414.1; 455/406; 455/416; 455/417; 379/265.01; 379/265.02; 379/265.03; 379/265.13; 379/266.07; 379/279
(58) Field of Classification Search
USPC .......... 455/414.1, 406, 416, 417; 379/265.03, 379/265.02, 265.13, 266.07, 265.01, 279
See application file for complete search history.

(56) References Cited

U.S. PATENT DOCUMENTS

| 1,191,425 | A | 7/1916 | Huddle |
| 4,592,085 | A | 5/1986 | Watari et al. |
| 5,390,278 | A | 2/1995 | Gupta et al. |
| 5,422,916 | A | 6/1995 | Nall |
| 6,718,368 | B1 | 4/2004 | Ayyadurai |
| 6,834,270 | B1 | 12/2004 | Pagani et al. |
| 6,879,257 | B2 | 4/2005 | Hisano et al. |
| 7,003,570 | B2 | 2/2006 | Messinger et al. |
| 7,047,027 | B2 | 5/2006 | Jeon |
| 7,151,490 | B2 | 12/2006 | Richards |

(Continued)

FOREIGN PATENT DOCUMENTS

| CA | 2493180 A1 | 7/2005 |
| EP | 1340096 A1 | 9/2003 |

(Continued)

OTHER PUBLICATIONS

Blackwell T., "Fast Decoding of Tagged Message Formats," Proceeding IEEE INFOCOM '96, Mar. 24-28, 1996, Copyright 1996 IEEE, pp. 224-231.

(Continued)

*Primary Examiner* — Kwasi Karikari
(74) *Attorney, Agent, or Firm* — Cantor Colburn LLP; Preston Young (57) ABSTRACT

A method for administering a communication session includes initiating a session between a server and a user device, the user device associated with a user phone number, associating the user phone number and a first session state phone number with a state of the session, and sending a first message associated with the state of the session from the server to the user device, the first message sent from the first session state phone number to the user phone number.

17 Claims, 5 Drawing Sheets

(56) References Cited

U.S. PATENT DOCUMENTS

| | | | |
|---|---|---|---|
| 7,163,151 B2 | 1/2007 | Kiiskinen | |
| 7,177,795 B1 | 2/2007 | Chen et al. | |
| 7,209,949 B2 | 4/2007 | Mousseau et al. | |
| 7,228,228 B2 | 6/2007 | Bartlett et al. | |
| 7,263,597 B2 | 8/2007 | Everdell et al. | |
| 7,266,754 B2 | 9/2007 | Shah et al. | |
| 7,337,115 B2 | 2/2008 | Liu et al. | |
| 7,512,659 B2 | 3/2009 | Keohane et al. | |
| 7,551,935 B2 | 6/2009 | Karmakar | |
| 7,634,528 B2 | 12/2009 | Horvitz et al. | |
| 7,693,945 B1 | 4/2010 | Dulitz et al. | |
| 7,729,689 B2 | 6/2010 | Chakraborty et al. | |
| 7,886,083 B2 | 2/2011 | Pinkerton et al. | |
| 2002/0138582 A1 | 9/2002 | Chandra et al. | |
| 2002/0165961 A1 | 11/2002 | Everdell et al. | |
| 2003/0009385 A1 | 1/2003 | Tucciarone et al. | |
| 2003/0031309 A1* | 2/2003 | Rupe et al. | 379/265.02 |
| 2003/0033394 A1 | 2/2003 | Stine | |
| 2003/0115366 A1 | 6/2003 | Robinson | |
| 2003/0120822 A1 | 6/2003 | Langrind et al. | |
| 2003/0182421 A1 | 9/2003 | Faybishenko et al. | |
| 2004/0019648 A1 | 1/2004 | Huynh et al. | |
| 2004/0022264 A1 | 2/2004 | McCue | |
| 2004/0024817 A1 | 2/2004 | Pinkas | |
| 2004/0260551 A1 | 12/2004 | Atkin et al. | |
| 2005/0010573 A1 | 1/2005 | Garg | |
| 2005/0038660 A1 | 2/2005 | Black et al. | |
| 2005/0060372 A1 | 3/2005 | DeBettencourt et al. | |
| 2005/0060381 A1 | 3/2005 | Huynh et al. | |
| 2005/0102625 A1 | 5/2005 | Lee et al. | |
| 2005/0114357 A1 | 5/2005 | Chengalvarayan et al. | |
| 2005/0171768 A1 | 8/2005 | Gierach | |
| 2005/0192808 A1 | 9/2005 | Sugiyama | |
| 2005/0198270 A1 | 9/2005 | Rusche et al. | |
| 2006/0015339 A1 | 1/2006 | Charlesworth et al. | |
| 2006/0036441 A1 | 2/2006 | Hirota | |
| 2006/0109976 A1* | 5/2006 | Sundaram et al. | 379/265.02 |
| 2006/0155854 A1 | 7/2006 | Selgert | |
| 2006/0287867 A1 | 12/2006 | Cheng et al. | |
| 2007/0019793 A1 | 1/2007 | Cheng | |
| 2007/0025543 A1* | 2/2007 | Vadlakonda et al. | 379/265.02 |
| 2007/0078986 A1 | 4/2007 | Ethier et al. | |
| 2007/0171066 A1 | 7/2007 | Fein et al. | |
| 2007/0174326 A1 | 7/2007 | Schwartz et al. | |
| 2007/0192422 A1 | 8/2007 | Stark et al. | |
| 2007/0237135 A1 | 10/2007 | Trevallyn-Jones et al. | |
| 2007/0290787 A1 | 12/2007 | Fiatal et al. | |
| 2008/0004056 A1 | 1/2008 | Suzman | |
| 2008/0057922 A1 | 3/2008 | Kokes et al. | |
| 2008/0075433 A1 | 3/2008 | Gustafsson | |
| 2008/0083024 A1 | 4/2008 | Glazer et al. | |
| 2008/0091723 A1 | 4/2008 | Zuckerberg et al. | |
| 2008/0159266 A1 | 7/2008 | Chen et al. | |
| 2008/0162132 A1 | 7/2008 | Doulton | |
| 2008/0233977 A1 | 9/2008 | Xu et al. | |
| 2008/0233981 A1 | 9/2008 | Ismail | |
| 2009/0012841 A1 | 1/2009 | Saft et al. | |
| 2009/0031006 A1 | 1/2009 | Johnson | |
| 2009/0037515 A1 | 2/2009 | Zapata et al. | |
| 2009/0094190 A1 | 4/2009 | Stephens | |
| 2009/0099906 A1 | 4/2009 | Kirley et al. | |
| 2009/0125595 A1 | 5/2009 | Maes | |
| 2009/0128335 A1 | 5/2009 | Leung | |
| 2009/0131080 A1 | 5/2009 | Nadler et al. | |
| 2009/0131087 A1 | 5/2009 | Johan | |
| 2009/0150786 A1 | 6/2009 | Brown | |
| 2009/0164287 A1 | 6/2009 | Kies et al. | |
| 2009/0186641 A1 | 7/2009 | Vaananen | |
| 2009/0191902 A1 | 7/2009 | Osborne | |
| 2009/0199114 A1 | 8/2009 | Lewis et al. | |
| 2009/0210226 A1 | 8/2009 | Ma | |
| 2009/0216805 A1 | 8/2009 | Coffman et al. | |
| 2009/0265631 A1 | 10/2009 | Sigurbjornsson | |
| 2009/0270068 A1 | 10/2009 | Ahopelto et al. | |
| 2009/0271380 A1 | 10/2009 | Julia et al. | |
| 2009/0276488 A1 | 11/2009 | Alstad | |
| 2010/0015956 A1 | 1/2010 | Qu et al. | |
| 2010/0023451 A1 | 1/2010 | Lambert et al. | |
| 2010/0030578 A1 | 2/2010 | Siddique et al. | |
| 2010/0049599 A1 | 2/2010 | Owen et al. | |
| 2010/0087172 A1 | 4/2010 | Klassen et al. | |
| 2010/0122331 A1 | 5/2010 | Wang et al. | |
| 2010/0128335 A1 | 5/2010 | Maeda et al. | |
| 2010/0158236 A1* | 6/2010 | Chang et al. | 379/265.03 |
| 2010/0201845 A1 | 8/2010 | Feinberg et al. | |
| 2010/0210248 A1 | 8/2010 | Morrissey et al. | |
| 2010/0287197 A1 | 11/2010 | Wang et al. | |
| 2010/0296646 A1* | 11/2010 | Hemm et al. | 379/265.02 |
| 2011/0021178 A1 | 1/2011 | Balasaygun et al. | |
| 2011/0035284 A1 | 2/2011 | Moshfeghi | |
| 2011/0061068 A1 | 3/2011 | Ali et al. | |
| 2011/0072015 A1 | 3/2011 | Lin et al. | |
| 2011/0145356 A1 | 6/2011 | Tanner | |
| 2011/0153723 A1 | 6/2011 | Mutnuru et al. | |
| 2011/0153839 A1 | 6/2011 | Rajan et al. | |
| 2011/0212736 A1 | 9/2011 | Jaime et al. | |
| 2011/0219018 A1 | 9/2011 | Bailey et al. | |
| 2011/0231747 A1 | 9/2011 | Zuckerberg et al. | |
| 2011/0246560 A1 | 10/2011 | Gibson | |
| 2012/0134548 A1 | 5/2012 | Rhoads | |
| 2013/0100301 A1 | 4/2013 | Rhoads | |

FOREIGN PATENT DOCUMENTS

| | | |
|---|---|---|
| GB | 2396520 A | 6/2004 |
| GB | 2461730 A | 1/2010 |
| WO | 2005025155 A1 | 3/2005 |
| WO | 2006127791 A2 | 11/2006 |
| WO | 2007086683 A1 | 8/2007 |
| WO | 2008026945 A1 | 3/2008 |
| WO | 2009012516 A1 | 1/2009 |
| WO | 2009135292 A1 | 11/2009 |

OTHER PUBLICATIONS

Office Action—Non-final dated Mar. 15, 2012 for U.S. Appl. No. 12/718,041.

IBM et al., "Apparatus for Sending a Sequence of Asynchronous Messages Through the Same Channel in a Messaging Middleware Cluster," Published Oct. 4, 2005, Copyright IP.com, Inc., pp. 1-7.

Dey, Anind K. et al., "CybreMinder: A Context Aware System for Supporting Reminders," HUC 2000, LNCS 1927, pp. 172-186, 2000.

ACM Digital Library, [online]; [retrieved on Mar. 14, 2011]; retrieved from the Internet http://portal.acm.org/citation.cfm?id=1670452 Alberto Gonzalez Prieto et al.,"Adaptive Performance Management for SMS Systems," Journal of Network and Systems Management; vol. 17 Issue 4, Dec. 2009.

NMS Adaptive, [online]; [retrieved on Mar. 14, 2011]; retrieved from the Internet http://www.nms-adaptive.com/products/pages/desktop-sms-frameset.htm.

Carnegie Mellon University, [online]; [retrieved on Mar. 14, 2011]; retrieved from the Internet http://citeseerx.ist.psu.edu/viewdoc/download?doi=10.1.1.70.4047&rep=rep1&type=pdf Daniel Siewiorek et al.,"SenSay: A Context-Aware Mobile Phone," 2003.

The Symbian Blog [online]; [retrieved on Mar. 15, 2011]; retrieved from the Internet http://www.symbianzone.co.cc/2010/08/sms-tag-v10-sms-organizer-symbian-os-94.html Symbian SMS Tag Organizer; 2010.

AdaptiveMobile [online]; [retrieved on Mar. 15, 2011]; retrieved from the Internet http://www.adaptivemobile.com 2011.

International Search Report; International Application No. PCT/US11/23557; International Filing Date: Feb. 3, 2011; Date of Mailing: Apr. 4, 2011.

International Search Report—Written Opinion; International Application No. PCT/US11/23557; International Filing Date: Feb. 3, 2011; Date of Mailing: Apr. 4, 2011.

Zhumatiy, V., et al., "Metric State Space Reinforcement Learning for a Vision-Capable Mobile Robot," Technical Report; IDSIA; Mar. 2006.

Ricci et al., "Acquiring and Revising Preferences in a Critique-Based Mobile Recommender System," May/Jun. 2007, vol. 22, No. 3, IEEE

(56) References Cited

OTHER PUBLICATIONS

Computer Society, Copyright 2007 IEEE.
International Preliminary Report on Patentability; for International Patent Application No. PCT/US2011/023557; International Filing Date: Feb. 3, 2011; 5 pages.
Best Shareware, "SoundPix Plus", http://www.bestshareware.net/download/soundpixplus.htm, retrieved from the internet on Jan. 12, 2012, 2 pages.
Computerworld, "Facebook photo privacy PANIC: Auto-tag apology and apologia", http://blogs.computerworld.com/18435/facebook_photo_privacy_panic_auto_tag_apology_and_apologia, retrieved from the internet on Jan. 12, 2012, 7 pages.
Digital Photography School, "Columbus V-900 GPS Voice Photo Data Logger Review", http://www.digital-photography-school.com/columbus-v-900-gps-voice-photo-data-logger-review, retrieved from the internet on Jan. 12, 2012, 3 pages.
Google Image Labeler, http://en.wikipedia.org/wiki/Google_Image_Labeler, Aug. 31, 2006, 4 pages.
Mobile Phones Nokia patents voice tagging of hotos, http://www.mobilephones.org.uk/nokia/nokia-patents-voice-tagging-of-photos/, retrieved from the internet on Apr. 12, 2012, 4 pages.
resco.net Developer & Mobile Enterprise, "How to use mobile devices camera and microphone in business applications", http://www.resco.net/developer/company/articles.aspx?file=articles/article14, retrieved from the internet on Jan. 12, 2012, 6 pages.
"Sentiment140", http://help.sentiment140.com/, retrieved from Internet May 8, 2012, 2 pages.
The Stanford Natural Language Processing Group, "Stanford Log-linear Part-Of_Speech Tagger", http://npl.stanford.edu/software/tagger.shtml, retrieved from the Internet on Apr. 11, 2012, 3 pages.
Bae et al., "TagReel: A Visualization of Tag Relations among User Interests in the Social Tagging System", 2009 Six International Conference on Computer Graphics, Imaging and Visualization, IEEE Computer society, 2009, pp. 437-442.
Hosy, Marc, Indexing/Labeling?Enhancing digital pictures using Voice Tags/Commands/Comments, www.ip.com, IP.com electronicl IPCOM000169425D; Publication Apr. 22, 2008; 3 pages.
USPTO OA for U.S. Appl. No. 13/052,501 filed Mar. 21, 2011, mailed Oct. 10, 2013, 18 pages.
USPTO OA for U.S. Appl. No. 13/608,078 filed Sep. 10, 2012, mailed Sep. 11, 2013, 18 pages.

* cited by examiner

| USER PHONE NUMBER | SESSION STATE PHONE NUMBER | SESSION STATE IDENTIFIER |
|---|---|---|
| UN1 | PN0 | A:1 |
| UN1 | PN1 | A:2 |
| UN1 | PN2 | A:4 |
| UN1 | PN5 | B:4 |
| UN1 | PN6 | A:5 |
| UN2 | PN0 | A:1 |
| UN2 | PN1 | A:2 |

DATA SESSION SYNCHRONIZATION WITH PHONE NUMBERS

CROSS-REFERENCE TO RELATED APPLICATIONS

This is a continuation application of and claims priority from U.S. application Ser. No. 13/052,488, filed on Mar. 21, 2011, the entire contents of which are incorporated herein by reference.

BACKGROUND

The present invention relates to sending and receiving data over a phone network, and more specifically, to data sessions using phone numbers.

Though the functions of available mobile telephone devices continue to advance, there are significant numbers of users who utilize mobile telephone devices with limited functions or features. For example, in contrast to "smart phones" millions of mobile telephone device users use simple mobile telephone devices with voice and texting/short message service (SMS), but with limited alternative communications features.

BRIEF SUMMARY

According to one embodiment of the present invention, a method for administering a communication session includes initiating a session between a server and a user device, the user device associated with a user phone number, associating the user phone number and a first session state phone number with a state of the session, and sending a first message associated with the state of the session from the server to the user device, the first message sent from the first session state phone number to the user phone number.

According to another embodiment of the present invention a method for administering a communication session includes receiving a message from a user device, the message associated with a user phone number associated with the user device, associating the user phone number and a first session state phone number with a state of the session such that the user phone number and the first session state phone number uniquely identify the state of the session, and saving the user phone number, the first session state phone number, and the associated state of the session in a memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

2

DETAILED DESCRIPTION

In many mobile telephone service areas, some users may utilize voice features and texting or SMS features, but may not use other data services due to device or network limitations, or the cost of wireless data transmission over the networks. The illustrated embodiments described below allow a user to interact with a server in a session to perform a variety of tasks using text messaging or voice messaging features. Though the illustrated embodiments describe texting or SMS services, one of ordinary skill in the art would understand that any type similar messaging service including voice messaging, which may be in some embodiments converted to textual messages or processed with voice recognition methods may be used in a similar manner as described below.

Users of a messaging-capable mobile telephone device wanting to utilize a data service may send messages to or receive messages from a server. A session is initiated (and may be also completed) during the exchange of messages. A session may be variously known as a conversation, a dialogue, or a connection. The server maintains the state of the session. The server communicates the state to the device and then at later time the device communicates the state back to the server, allowing the service to be performed according to the communicated state. The state could be sent as part of the message and then the message returned to the server, but has the disadvantage that the state becomes part of the message, reducing the space for message data. Therefore, a way is needed to communicate the state of a session to a simple telephone device.

Figure 1:
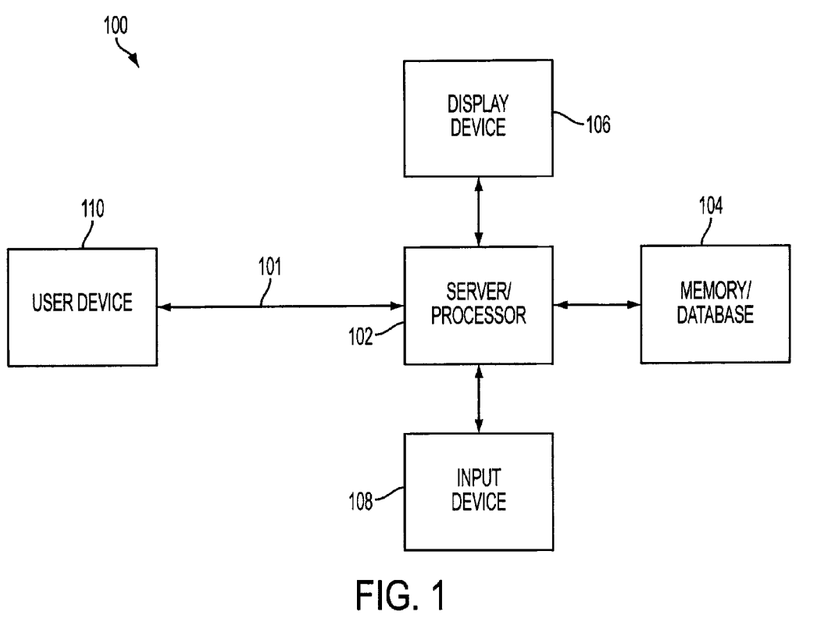
FIG. 1 illustrates an exemplary embodiment of a system.

FIG. 1 illustrates an exemplary embodiment of a system 100. The system 100 includes a server or processor 102 that is communicatively connected to a memory or database 104, a display device 106, and an input device 108. The server 102 is communicatively connected to a user device 110 that may include, for example, a mobile phone or other type of user device via a communications network 101. Though the illustrated embodiment includes one user device 110, the system 100 may include any number of user devices 110. The server 102 is operative to receive messages sent from the user device 110 that may be addressed to one or more phone numbers associated with the server 102. For example, the user device may send a message to the server 102 by addressing the message to a particular phone number. The server 102 receives the message that includes the phone number of the sender; the phone number that the message was sent to; and the content of the message.

Figure 2:
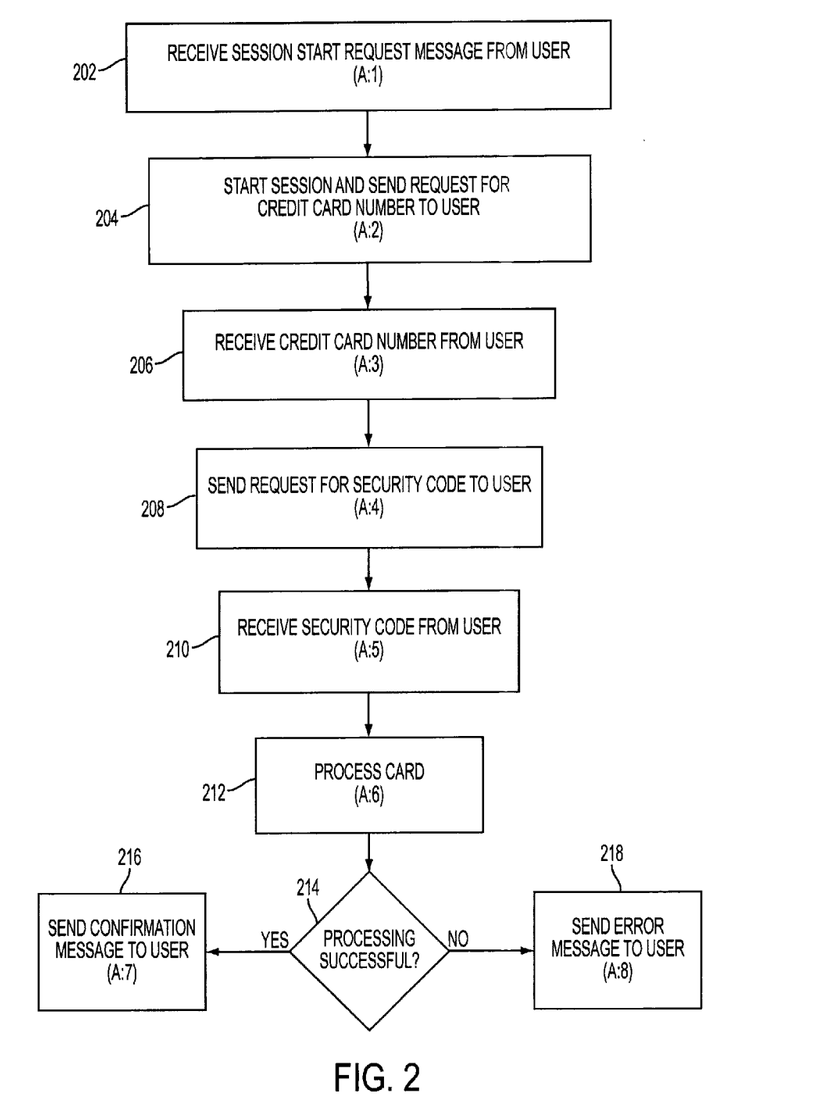
FIG. 2 illustrates a block diagram of an example of a portion of a session.

FIG. 2 illustrates a block diagram of an example of a portion of a session "A" that allows a user to pay their water bill using the system 100 (of FIG. 1). A session may include, for example, any type of data exchange between at least one user device and a server. A session may be initiated by, for example, either the server 102, the user device 110, or in some embodiments, another processor. In this regard, the user device 110 sends a session start message to the server 102 via a phone number initially known by the user (PN0) (e.g., "555-BILL"). An example message received by the server includes the phone number of the sending user device (UN1), the phone number associated with the session initiation PNO, and the content line "Pay my water bill," or more generally <sender number; recipient number; message content>. When initiating a session, the server 102 may use the PN0 number, the UN1, the content line, or any combination of these elements to identify the session that will be initiated. For example, the PN0 may be uniquely associated with the pay water bill session, thus a message received from a user device 110 that has been sent to PN0 will initiate the pay water bill session. Alternatively, the server may also use the content of the message (e.g., "Pay my water bill" or "Pay my electricity bill") to identify the session by logically determining that the user would like to pay their water bill or another type of bill depending on the message content. In the illustrated example, the message received by the server 102 has been sent to PN0. The receipt of this message defines a session state A:1 in block 202. The session state A:1 may, for example, be associated with a request to initiate a session. In block 204, the server 102 starts the session and sends a request for a credit card number to the user, which defines session state A:2. The credit card number is received from the user in block 206, which defines session state A:3. In block 208, in session state, A:4, the server 102 sends a request for a security code to the user device 110. The security code is received from the user device 110 in block 210, defining session state A:5. In block 212, the server 110 processes the card number in session state A:6). In block 214, the server determines whether the card processing was successful. If yes, in block 216, the server 102 sends a confirmation message to the user device 110 in session state A:7. If no, an error message is sent to the user device 110 in block 218, session state A:8.

Figure 3:
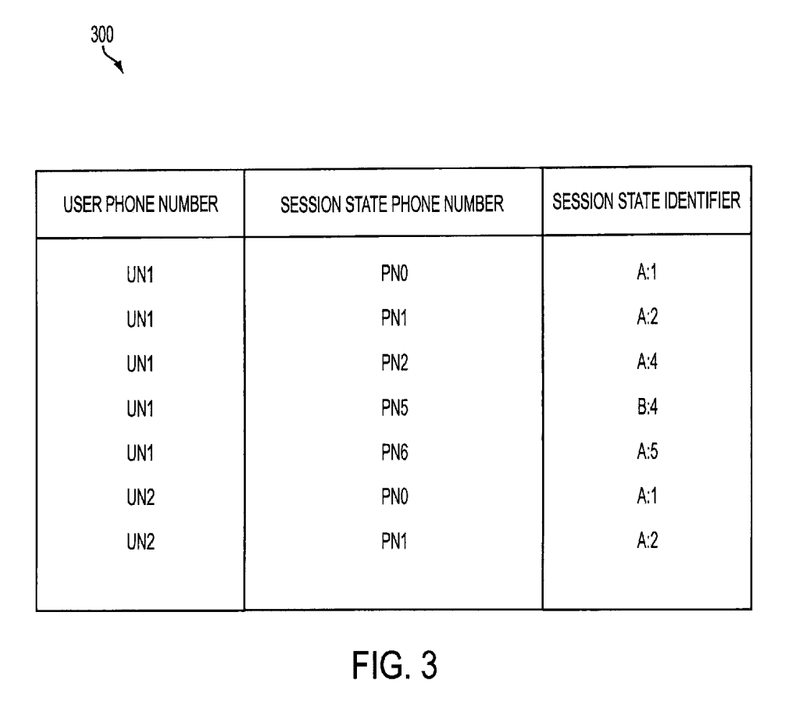
FIG. 3 illustrates an example of a session state table.

To properly administer the session, the server 102 tracks the state of the session by associating phone numbers with session states. FIG. 3 illustrates an example of a session state table 300. The session state table 300 includes a user device phone number field, a session state phone number field, and a session state identifier field. The operation of the session state table 300 will be further described below. A session state phone number includes a phone number associated with a particular session state.

Figure 4A:
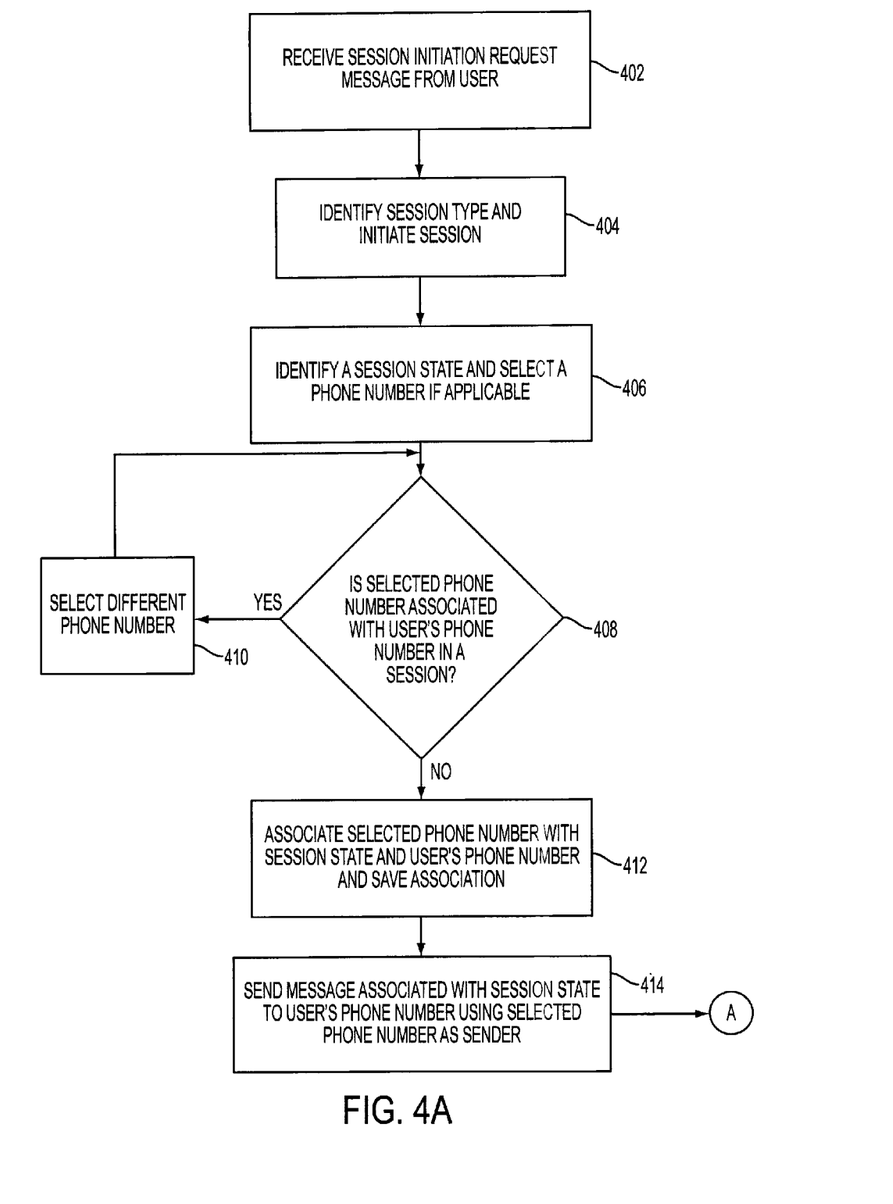
FIGS. 4A and 4B illustrate a block diagram of an exemplary method for initiating and processing a session with the system of FIG. 1.
Figure 4B:
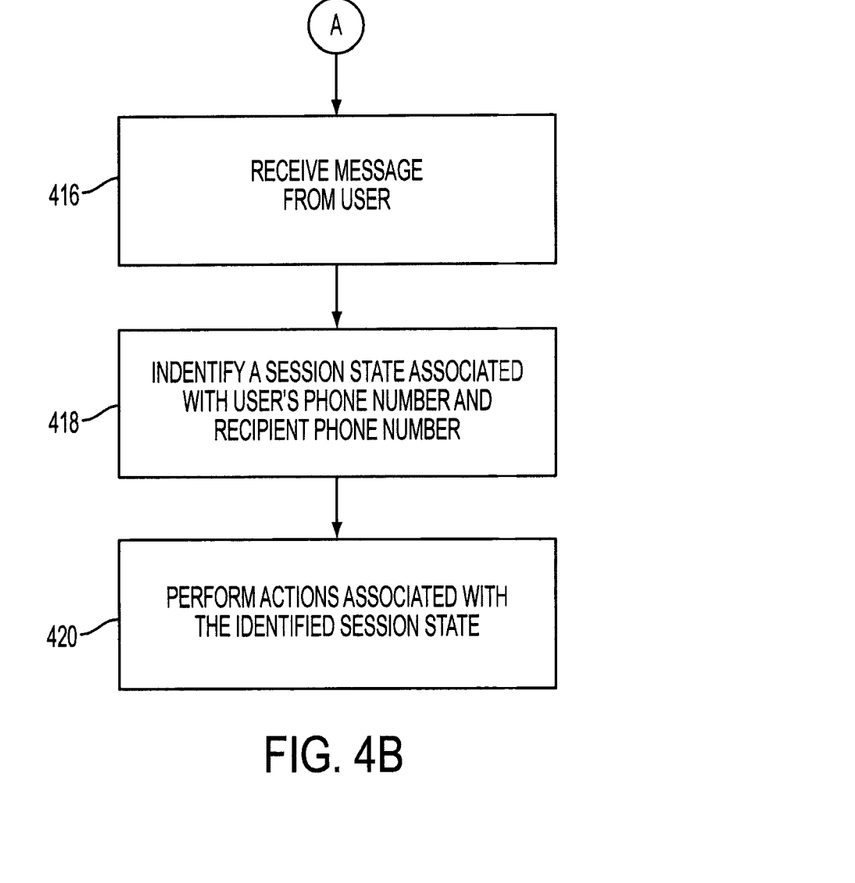

FIGS. 4A and 4B illustrate a block diagram of an exemplary method for initiating and processing a session with the system 100 (of FIG. 1). In this regard, in block 402, a message is received by the server 102 from the user device 110. The message includes the user device phone number UN1; the session initiation phone number PN0 (i.e., a phone number associated with the server 102 and/or a session orchestrated by the server 102); and a textual message "Pay my water bill" encoded as the tuple <UN1; PN0; Pay my water bill>. In block 404, the server 102 identifies the session type (e.g. session A, of FIG. 2) and initiates the session. In block 406, the server 102 identifies the session state (e.g., A:2) and prepares to send a request for a credit card number to the user by selecting an available phone number from a pool of phone numbers reserved for use by the server 102 where the pool of phone numbers includes PN0-PNn-1. In block 408 the server 102 uses the session state table 300 (of FIG. 3) to determine whether the selected phone number (PN1) has been associated with the user device 110 phone number UN1 in the present session or any other session. If a phone number is not available or cannot be selected then an error state is flagged. If the selected phone number PN1 has been previously associated with the UN1, a different number is selected by the server 102, in block 410. In block 412, once an unassociated phone number is selected, the number is associated with the current session state and the user device 110 phone number and saved in the table 300 as the session state phone number. In block 414, a message associated with the current session state is sent to the user device 110 via the selected phone number (e.g., <PN1; UN1; Please provide your credit card number>). A response from the user device 110 with the credit card number is received by the server in block 416 (e.g., <UN1; PN1; xxxxxxxxxx09005>). In block 418, the server 102 identifies the session state using the table 300 and the UN1; PN1 fields in the message. In the illustrated example, the message received from UN1 sent to the number PN1 indicates that sessions A:2 and A:3 have been completed. In block 420, the action associated with the current session state may be performed (e.g., saving the received credit card number) and the session may progress to the next applicable session state (e.g., sending a request for a security code to user A:4) In the illustrated example, another phone number may be associated with the next session state (A:4) for the next message (e.g., <PN2; UN1; Please provide security code>) that will be sent to the user device 110.

The combination of the user phone number and the session state phone number allows the server 102 to identify the session state for any number of sessions for any number of users. Referring to FIG. 3, a session state B:4 has been associated with UN1 and PN5, which would, for example, identify a different session (i.e., Session B) associated with the user device 110 using the phone number UN1. The illustrated example also includes, another user device 110 having a phone number UN2 that is associated with the session state A:1 and the session state phone number PN0. Since the user phone numbers (UN1 and UN2) are different, the same session state phone number PN0) may be associated with different users to identify associated session states.

The technical effects and benefits of the illustrated embodiments allow a server to identify and track the states of multiple sessions between the server and any number of users using a combination of the phone number of the user and phone numbers associated by the server with states of the sessions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for administering a communication session, the method including:
    initiating a session between a server and a user device, the user device associated with a user phone number;
    associating the user phone number and a first session state phone number with a state of the session;
    sending a first message associated with the state of the session from the server to the user device, the first message sent from the first session state phone number to the user phone number;
    receiving a second message from the user device, the second message sent from the user phone number to the first session state phone number;

identifying a current session state associated with the user phone number and the first session phone number;

processing the second message;

responsive to processing the second message, associating the user phone number and a second session state phone number with a third state of the session; and sending a second message associated with the state of the session from the server to the user device, the second message sent from the second session state phone number to the user phone number.

2. The method of claim 1, wherein the initiation of the session includes:

receiving an initiation message from the user device, the message sent from the user phone number to a session state phone number associated with session initiation; and initiating the session responsive to receiving the initiation message.

3. The method of claim 2, wherein the initiation message includes a textual portion indicative of a type of session initiation.

4. The method of claim 2, wherein the initiation message includes a voice portion indicative of a type of session initiation.

5. The method of claim 3, wherein the textual portion is entered by a user.

6. The method of claim 4, wherein the voice portion is entered by a user.

7. A method for administering a communication session, the method including:

receiving a message from a user device, the message associated with a user phone number associated with the user device;

associating the user phone number and a first session state phone number with a state of the session such that the user phone number and the first session state phone number uniquely identify the state of the session; and saving the user phone number, the first session state phone number, and the associated state of the session in a memory, sending a first message associated with the state of the session from the server to the user device the first message sent from the first session state phone number to the user phone number;

receiving a second message from the user device, the second message sent from the user phone number to the first session state phone number;

identifying a current session state associated with the user phone number and the first session phone number;

processing the second message;

responsive to processing the second message, associating the user phone number and a second session state phone number with a third state of the session; and sending a second message associated with the state of the session from the server to the user device the second message sent from the second session state phone number to the user phone number.

8. A system for administering a communications session, the system comprising a server including a processor operative to initiate a session between a server and a user device, the user device associated with a user phone number, associate the user phone number and a first session state phone number with a state of the session, and send a first message associated with the state of the session from the server to the user device, the first message sent from the first session state phone number to the user phone number, wherein the processor is further operative to receive a second message from the user device, the second message sent from the user phone number to the first session state phone number, identify a current session state associated with the user phone number and the first session phone number, and process the second message; and wherein the processor is further operative to, responsive to processing the second message, associate the user phone number and a second session state phone number with a third state of the session and send a second message associated with the state of the session from the server to the user device, the second message sent from the second session state phone number to the user phone number.

9. The system of claim 8, wherein the initiation of the session includes:

receiving an initiation message from the user device, the message sent from the user phone number to a session state phone number associated with session initiation; and initiating the session responsive to receiving the initiation message.

10. The system of claim 9, wherein the initiation message includes a textual portion indicative of a type of session initiation.

11. The system of claim 10, wherein the textual portion is entered by a user.

12. The system of claim 8, wherein the server is connected to the user device via a communications network.

13. The system of claim 8, wherein the user device is a mobile telephone device.

14. A non-transitory computer-readable storage medium including computer executable instructions that, when executed on a processor of a computer apparatus, direct the processor to perform a method for dynamically adjusting a hardware event counting time-slice window, the method comprising:

initiating a session between a server and a user device, the user device associated with a user phone number;

associating the user phone number and a first session state phone number with a state of the session;

sending a first message associated with the state of the session from the server to the user device, the first message sent from the first session state phone number to the user phone number;

receiving a second message from the user device, the second message sent from the user phone number to the first session state phone number;

identifying a current session state associated with the user phone number and the first session phone number;

processing the second message;

responsive to processing the second message, associating the user phone number and a second session state phone number with a third state of the session; and sending a second message associated with the state of the session from the server to the user device, the second message sent from the second session state phone number to the user phone number.

15. The computer-readable storage medium of claim 14, wherein the initiation of the session includes:

receiving an initiation message from the user device, the message sent from the user phone number to a session state phone number associated with session initiation; and initiating the session responsive to receiving the initiation message.

16. The computer-readable storage medium of claim 15, wherein the initiation message includes a textual portion indicative of a type of session initiation.

17. The computer-readable storage medium of claim 16, wherein the textual portion is entered by a user.

* * * * *